E. PULIFICI.
MANUALLY OPERATED HAY AND STRAW PRESS.
APPLICATION FILED DEC. 3, 1910.
1,043,358.
Patented Nov. 5, 1912.
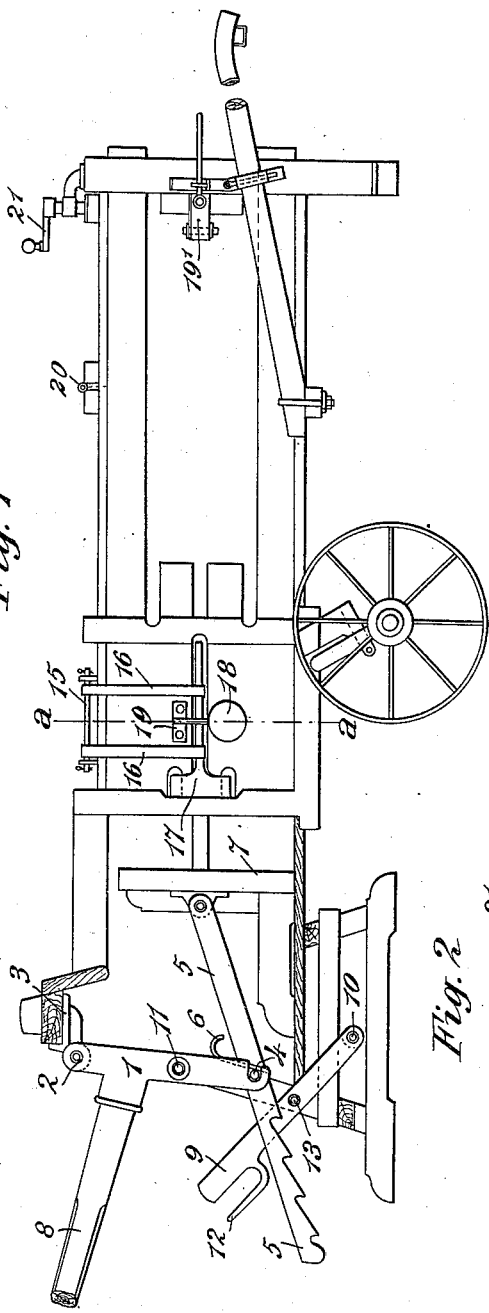

UNITED STATES PATENT OFFICE.

EMIDIO PULIFICI, OF MAGLIANO SABINO, ITALY.

MANUALLY-OPERATED HAY AND STRAW PRESS.

1,043,358.  Specification of Letters Patent.  Patented Nov. 5, 1912.

Application filed December 3, 1910. Serial No. 595,436.

*To all whom it may concern:*

Be it known that I, EMIDIO PULIFICI, mechanical engineer, a subject of the King of Italy, residing at Magliano Sabino, Italy, have invented certain new and useful Improvements in Manually-Operated Hay and Straw Presses, of which the following is a specification.

The object of my present invention is to provide an economical manually operated hay and straw press with simple and multiple lever, adapted to substitute the usual costly mechanical and motor presses, and particularly useful in mountainous regions where motor presses cannot be installed and worked but with the utmost difficulties, and the usual hand presses do not give the desired results, the compression being incomplete and an excessive effort being required.

One of the forms of my new simple and multiple lever hand press is illustrated by way of example in the annexed drawings where:

Figure 1 is a side view of the press, Fig. 2 a section on line *a—a* of Fig. 1, Fig. 3 a detail view of racks, and Fig. 4 a detail view of locking hook.

Lever 1, Fig. 1, is pivoted on axle 2 of support 3 fixed on a beam supported by two trestles or jacks, the end of the beam engaging by means of a slot the pivot 4 of connecting rod 5, the two latter pieces being kept together by a lock 6. Connecting rod 5 is pivoted on the center of piston 7 adapted to slide to and fro according to the movements of lever 8.

The compression is effected by simple lever 8 until a sufficient quantity of hay or straw to form a bale has been put into the press, but this compression being insufficient, lever 8 is then detached from rod 5 and the latter connected to two bars 9 placed symmetrically and pivotally on support 10, by introducing pivot 11 of lever 1 into fork 12 of bar 9, and causing the first tooth of the rack of rod 5 to engage pivot 13 on bar 9, thus completing the compression of the bale by piston 7 pushing a movable partition wall between the bales which is prevented from recoiling by the horizontal rack 14 until it has reached the last tooth of the latter. The racks 14 are placed laterally toward the center of the box, Fig. 1, and pivoted to axle 15 to which they are connected by arms 16—16, and form one body with the two teeth 17, which latter hold the hay or straw when the operation is performed with the simple lever. Racks 14 instead of being kept in place by springs are kept in place by weight 18, Fig. 2, acting on the end of a lever-arm pivoted on support 19.

After one bale has been completed, in order to make others the simple lever is reconstituted by detaching bars 9 from rod 5 and causing lever 1 to again engage pivot 4 of rod 5. To eject the completed bales the movable rear abutment wall kept in place by two stationary teeth and one articulated tooth $19^1$ (Figs. 1 and 4) must be removed, the upper part of the press being capable of oscillating on 20 and being shifted at the other end by crank 21 to permit of regulating the ejection of finished bales.

The machine rolls on wheels rotatable on axle 22 the ends of which are S-shaped. When the machine is working the said axle is in horizontal position while when it is being transferred the said axle is placed in vertical position bearing on the two cast-iron supports held in place by pegs 23 (Figs. 1 and 2).

Having now fully described my said invention and the manner in which the same is to be performed, what I claim and intend to secure by Letters Patent of the United States as my invention is:

1. In a manually operated hay and straw press, a frame, a compressor piston, a connecting rod connected to said piston, a lever pivotally supported by said frame, means for connecting said lever directly to said rod whereby a simple lever action is obtained, a bar pivotally supported on said frame, means to connect said bar to said rod, and means to connect said lever to said bar, whereby a multiple action is obtained.

2. In a manually operated hay and straw press, a frame, a simple lever pivotally mounted thereon, a compressor piston, a connecting rod connected thereto, means for operatively connecting said lever with said rod, a forked bar pivotally supported by the frame, means for operatively connecting said forked bar to said rod, and means carried by said lever for engaging the forked portion of said bar, whereby said simple lever is transformed into a multiple lever.

3. In a manually operated hay and straw press, a frame, a simple lever with three unequal arms having one of its arms pivoted to said frame, a compressor piston, a connecting rod connected thereto, a pivot carried by said rod, one of the other arms of said lever having a groove adapted to receive said pivot, a latch for holding said pivot within said groove, a pair of bars pivotally mounted on said frame, one of said bars having a forked end, a pivot upon said lever adapted to engage said forked end, and a pivot upon one of said bars, said rod being provided with teeth adapted to engage said last mentioned pivot.

In testimony whereof I have signed my name to this specification in the presence of two subscribing witnesses.

EMIDIO PULIFICI.

Witnesses:
DUILIO NARDONI,
GIOVANNI BORTOLUZZI.